United States Patent [19]

Weber et al.

[11] Patent Number: 4,767,490

[45] Date of Patent: Aug. 30, 1988

[54] APPARATUS AND METHOD FOR PERMANENTLY JOINING SCREW CONVEYOR MODULES

[75] Inventors: Peter G. Weber, LaPlace; Michael K. Tan; Charles Dzuong, both of Metairie, all of La.

[73] Assignee: The Laitram Corporation, Harahan, La.

[21] Appl. No.: 34,730

[22] Filed: Apr. 6, 1987

[51] Int. Cl.⁴ .................... B29C 65/02; B29C 65/20
[52] U.S. Cl. ............................ 156/499; 156/304.2; 156/304.6; 156/502; 156/507; 156/580; 156/583.1
[58] Field of Search ........... 156/157, 502, 158, 304.2, 156/304.6, 499, 503, 507, 580, 73.5, 583.1

[56] References Cited

U.S. PATENT DOCUMENTS

| | | | |
|---|---|---|---|
| 3,253,972 | 5/1966 | Huddleston | 156/499 |
| 3,729,360 | 4/1973 | McElroy | 156/507 |
| 4,090,898 | 5/1978 | Tuskos | 156/73.5 |
| 4,457,795 | 7/1984 | Mason et al. | 156/73.5 |

Primary Examiner—Michael Wityshyn
Attorney, Agent, or Firm—James C. Kesterson

[57] ABSTRACT

Apparatus and a method for permanently joining integrally formed plastic screw conveyor modules is disclosed. A support means supported by a base supports a multiplicity of previously joined modules. A holding means also mounted to the base supports a single module to be joined to the already joined modules. The holding means supports the single module such that the axial member of the single module is aligned with the axial member of the multiplicity of modules. A melting means such as a heating plate is placed in firm contact between the ends of the modules to be joined until the plastic begins to melt. The heating plate is then removed and the modules while being supported firmly along their axis are pressed together and maintained in such a position until the melted plastic begins to solidify and thereby joining or bonding the single module to the already joined modules.

22 Claims, 6 Drawing Sheets

1

APPARATUS AND METHOD FOR PERMANENTLY JOINING SCREW CONVEYOR MODULES

TECHNICAL FIELD

This invention relates to apparatus and methods for permanently joining or bonding plastic screw conveyor modules and more particularly to such apparatus for joining such integrally molded plastic screw conveyor modules in a manner suitable for meeting USDA requirements for food processing. The modules are held in place by the apparatus by one end of each of the axial members or hub of the modules and are melted by heat. The ends of the two modules are then pressed together and allowed to solidify until complete bonding takes place.

BACKGROUND ART

As will be appreciated by those skilled in the art, specialized helical shaped devices such as screw conveyors are well known for the transport of various bulk material. Such conveyors generally include a helical shaped member which rotates within a housing or trough such that rotation of the screw conveyor along its longitudinal or central axis results in movement of the bulk material along the length of the device. In the past, such conveyors were typically constructed from metal and each conveyor was specifically designed for a particular purpose and of a particular length. However, although most prior art conveyors were specifically designed to meet a particular application, there had been some attempts of providing a modular type conveyor of metal and/or wood. Examples of U.S. Patents which disclose such modular conveyors include U.S. Pat. Nos. 349,233 issued to James Nelson on Sept. 10, 1886; 455,384 issued to H. Birkholz on July 7, 1891; 525,194 issued to J. Dyson, et al on Aug. 20, 1894; 546,879 issued to J. Dyson, et al on Sept. 14, 1895; 1,867,573 issued to D. G. Leach on July 19, 1932; 2,492,915 issued to A. B. Carlson on Dec. 27, 1949; 3,648,826 issued to Dean P. Brooks on Mar. 14, 1972 and 3,705,644 issued to Claude E. Kawchitch on Dec. 12, 1972. However, a study of the above patents indicates that only the two Dyson, et al patents, the Nelson patent and the Kawchitch patent can be considered sectional or modular. In addition, the assignee of the present application filed an application for Letters Patent on Sept. 29, 1983 for a "Modular Screw Conveyor" and which has Ser. No. 537,345 now abandoned, and on Apr. 4, 1984 filed and application for "Mold and Process for Manufacturing Helical Shaped Items" which has Ser. No. 598,374 now U.S. Pat. No. 4,693,861. An application entitled "Concealed Drive Coupling for Use With Modular Screw Conveyor" and having Ser. No. 822,641 was filed on Jan. 27, 1986 now U.S. Pat. No. 4,691,818. This application is also assigned to the assignee of the present invention.

In addition, it is believed that apparatus is available for bonding sections of plastic pipes together in a fluid or liquid tight manner by heating the ends and pressing the melted ends together. However, although there is similarity between the techniques of bonding tubular plastic sections together, the specific components, techniques and the overall concept as applied to bonding modular screw conveyor sections together is believed to be unique and different from that of bonding plastic pipe together.

As will be appreciated, one of the advantages of the plastic modular screw conveyor is ease of cleaning due to the smooth and noninterrupted surfaces. Also of course, by axially stacking any selected number of modules on the non-circular drive shaft a screw conveyor of any length can be fabricated. For certain USDA applications, the assemblage of individual modules must be sealed to each other at the end surfaces of the hub or axial members of each module to eliminate any cavities etc. which might harbor bacteria, and also to prevent the transmission of bacteria or liquids from the outside of the screw conveyor into the metal drive shaft area.

Therefore, it is an object of the present invention to provide apparatus and methods for joining or bonding the axial end of one module to the axial end of a second module in a fluid tight manner.

It is another object of the present invention to provide apparatus and methods which results in a bond or joint such that the joined members are axially aligned.

It is yet another object to provide apparatus and methods which allows a multiplicity of modules to be joined together.

SUMMARY

These and other objects and advantages will be obvious and will in part appear hereinafter, and will be accomplished by the present invention which provides apparatus and methods for permanently joining one end of the axial member of a first integrally formed plastic screw conveyor module to the axial member of a second integrally formed plastic screw conveyor module. Both of the modules joined by this process have an aperture extending from a first end to a second end through the axial member. The apparatus of the invention comprises a base for supporting an elongated support means. One embodiment of the invention includes a mandrel which extends through the aperture of the module as the elongated support means, whereas a second embodiment includes two parallel bars which support the flights of the modules as the elongated support means. Regardless of what embodiment used, the elongated support means supports the first module in a position such that the axial member of the module is aligned along a selected longitudinal axis. Also supported by the base is a holding means which supports a second module to be joined to the first in a position such that the axial member of the second module is aligned with the axial member of the first module. A brake means is also supported by the base for restricting movement of the first module along the longitudinal axis. A heating plate is pivotably mounted such that it can be swung into position between the first module and the second module. Thus, when the heating plate is firmly in contact with the ends of the respective modules, partial melting of the ends takes place. After the ends have been partially melted, a means for pressing, which is mounted to the base and is connected to either the brake means or the holding means, presses together and holds the partially melted ends under pressure while the mandrel and the holding means maintain the first and second modules in axial alignment. The two modules are held in such aligned positions with their ends pressed together until the partially melted ends of the respective modules solidify thereby resulting in the first and second modules being permanently bonded and joined together. An intermediate brake or clamping means may also be included for gripping a multiplicity of joined modules at an intermediate point.

BRIEF DESCRIPTION OF THE DRAWINGS

The above features of the present invention will be more clearly understood from consideration of the following description in connection with the accompanying drawings in which.

BEST MODE OF CARRYING OUT THE APPLICATION

Figure 1:
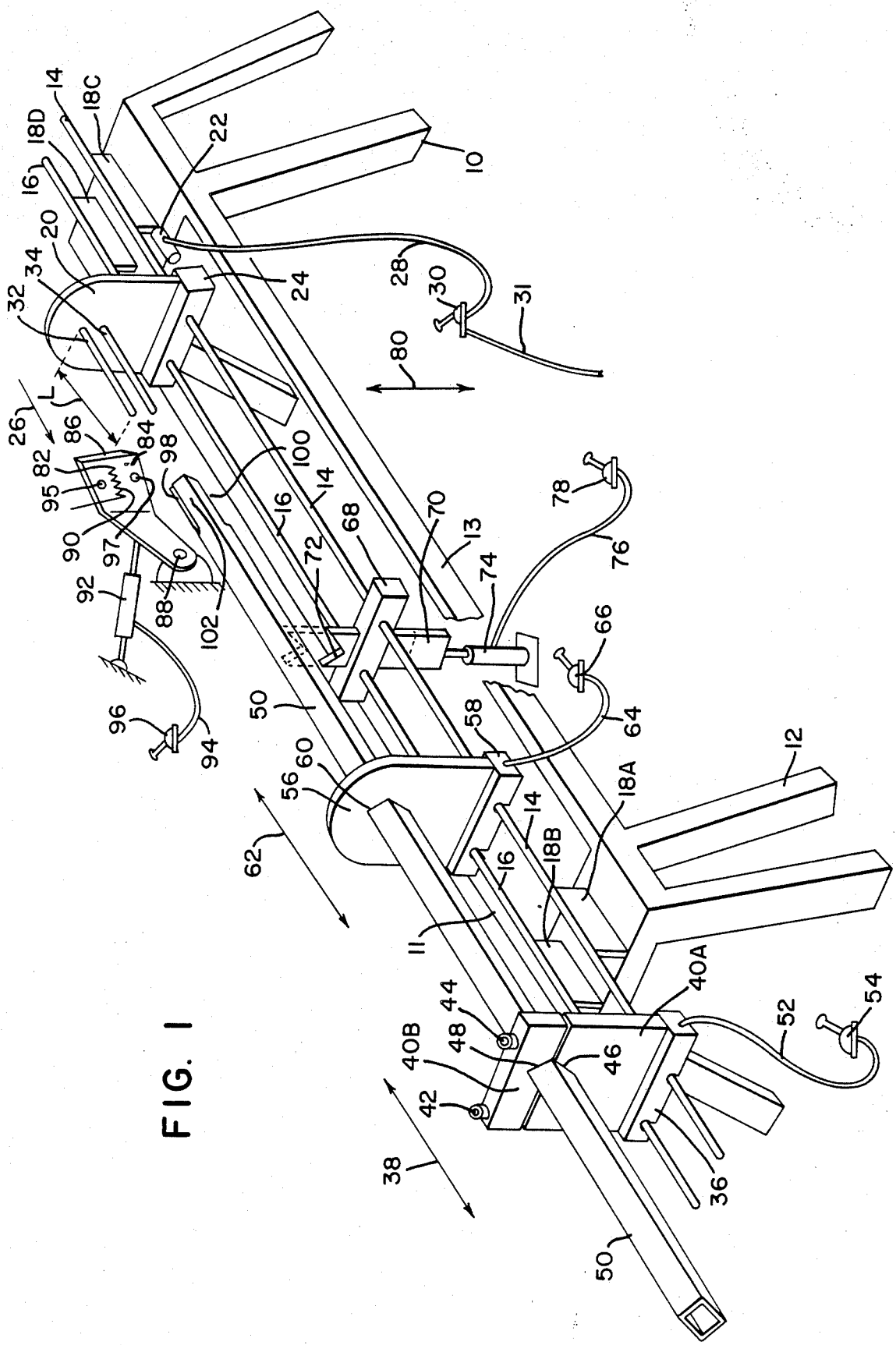
FIG. 1, is a perspective view of one embodiment of the apparatus of this invention for joining plastic screw conveyor modules.

Referring now to FIG. 1, there is shown a perspective view of the apparatus of this invention. As shown, the apparatus is supported by a base which may typically include a support stand 10 and a second support stand 12. Support stands 10 and 12 may also be joined by horizontal braces 11 and 13 to provide greater strength and stability. A pair of support rails 14 and 16 are mounted to stands 10 and 12 by vertical members 18A, 18B, 18C and 18D. Typically, support rails 14 and 16 will be polished bars suitable for acting as rails for allowing various structures to slide thereon as will be discussed hereinafter. More specifically, holding means or support means 20 is slidably mounted on support rails 14 and 16. Also as shown, a means such as a pneumatic cylinder 22 is shown as being connected to vertical member 18C and base 24 of holding means 20 such that the support means may be moved forcibly along rails 14 and 16 in the direction as indicated by arrow 26. Also as shown, cylinder 22 is connected by line 28 to an actuating lever 30. Actuating lever 30 receives air under pressure by means of supply line 31 from a source not shown.

It will be appreciated of course that any suitable means may be used for activating cylinder 22 when movement of the support head 20 is desired. In the embodiment shown in FIGS. 1 through 5, holding means 20 has a pair of parallel beams or bars 32 and 34 mounted to holding means 20 in a manner such that the length of the bars is parallel to the support rails 14 and 16. Also as shown, in the embodiment the bar 32 is mounted directly above bar 34 such that a line extending between diagonal corners of an axial member of a module having a square cross-section is horizontal. As shown, the length of the bars 32 and 34 as indicated by the arrow L in FIG. 1 will be selected to be very nearly the length of the axial member or hub of a plastic screw conveyor module to be joined by this apparatus. As will become apparent from the discussion of FIGS. 2 through 5, the actual length may be either greater or less than the module to be joined. A support base generally indicated at 36 also rides on support rails 14 and 16 and may be moved in a longitudinal direction along support rails 14 and 16 as indicated by double headed arrow 38. As shown, support base 36 includes a bottom portion 40A and a top portion 40B which is attachable to bottom portion 40A by means of allen head bolt members 42 and 44. As can be seen, bottom portion 40A includes a V shaped cut out 46 which cooperates with a similar V shape cut out 48 in top member 40. When the two members 40A and 40B are joined together, they define an aperture having a square or diamond shape suitable for supporting a support means such as elongated mandrel 50 which as shown has a square cross-section. Also, as can be seen in the drawings, mandrel 50 may be positioned anywhere along its length within the diamond or square shaped aperture defined by members 40A and 40B and then fixedly secured in such a position by tightening bolts 42 and 44 such that the mandrel 50 cannot move. Further, as is shown, the support base 36 includes a means for releasably gripping support rails 14 and 16 such as hydraulic or pneumatic means as indicated by line 52 and actuating member 54. Actuating member 54, as well as other actuating members discussed hereinafter, will also be supplied by air under pressure from a supply line and source as was discussed with respect to actuating member 30. Thus, it will be appreciated that the support member 36 may be readily moved by releasing the gripping means and then sliding the member to a selected location along the support rails 14 and 16 and then reactivating the gripping means so as to lock the support member in position. In a similar manner, there is also included a braking means or foot plate 56 which has a base portion 58 also slidably mounted on guide rails 14 and 16. As shown in FIG. 1, foot plate 56 includes a diamond or square shaped aperture 60 which has dimensions slightly greater than the dimensions of the square shaped mandrel 50. Thus, it would be appreciated that even when mandrel 50 is locked in place on support base 36, and support base 36 is itself locked into position on guide rails 14 and 16, because of the greater dimension of aperture 60, foot plate 56 may simply slide around stationary mandrel 50 as it moves along guide rails 14 and 16 as indicated by double headed arrow 62.

In a manner similar to that discussed with respect to support base 36, foot plate 56 also includes a gripping means such that it may be selectively and temporarily locked into position along guide rails 14 and 16. As shown, the gripping means may be a pneumatic or hydraulic means and activated for example by high pressure air supplied by line 64 and lever 66 as discussed heretofore. Thus, it will be appreciated that when the mandrel 50 is locked in position along with the support base 36, then the effective length of mandrel 50 between the support head 20 and the foot plate 56 can be readily adjusted by simply moving foot plate 56 to a selected position.

Figure 2:
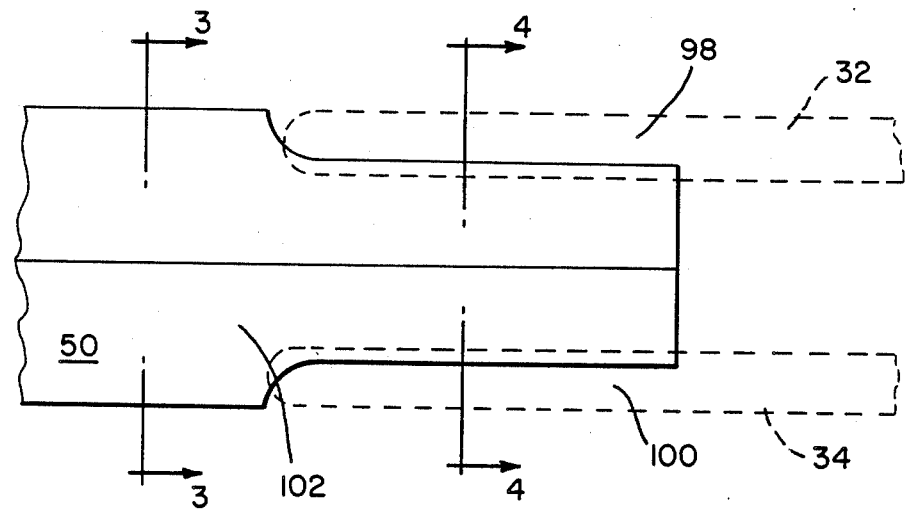
FIG. 2, is an enlarged side view of the working end of the support mandrel showing cutouts for receiving a pair of support bars.

Also as shown, an intermediate support member 68 readily slides along guide rails 14 and 16. Although means for gripping the guide rails could be included if desired, such gripping means is not normally necessary for intermediate support member 68. As shown support member 68 includes a vertically sliding member 70 having on its top surface a V shaped cut out 72 which as will be understood from FIG. 2 is suitable for supporting the joined screw conveyor modules. As can be seen, vertical member 70 is connected to a cylinder 74 such as a hydraulic or pneumatic cylinder activated by a line 76 and actuating lever 78. Further as can be seen, cylinder 74 operates to move vertical member 70 in an up and down direction as indicated by double headed arrow 80. Thus, it can be appreciated that the support member 68 may be operated by dropping the vertical member 70 to its lowest position so that it can slide past modules already joined by the apparatus, moving the member to a desired position along the longitudinal guide rails and then raising the support vertical member 70 with the V shaped cutout 72 up against the axial hub of a multiplicity of bonded or joined plastic screw conveyor modules.

Finally, there is shown a melting means such as heating plate 82 having a first contact surface 84 and a second contact surface 86. Heating means 82 is shown as being pivotally mounted to pivot point 88 such that it is suitable for rotational motion between a first position which is between mandrel 50 and bars 32 and 34, and a second position which is out of the way and located a selected distance from the first position. Also as shown, there is a heating element 90 such as an electrical heating plate which can carefully control the temperature of the heating faces 84 and 86. As shown, the melting means 82 may be moved into position such as by cylinder 92 which as will be understood may be a hydraulic or pneumatic cylinder activated by line 94 and activation lever 96. It will also be appreciated of course, that in the event support bars 32 and 34 are selected to be longer than the axial member of a module, it will be necessary for heating plate 82 to accommodate the support bars 32 and 34 such as by apertures 95 and 97.

Figure 3:
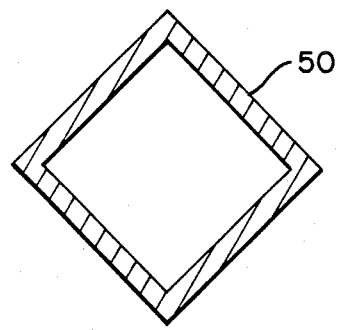
FIG. 3, is a cross-section of FIG. 2 taken through the body of the mandrel.
Figure 4:
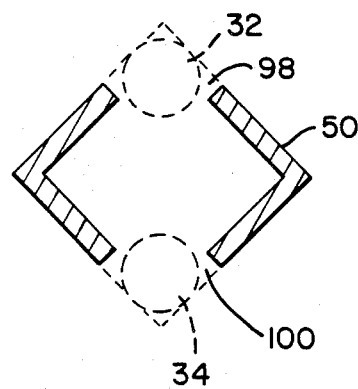
FIG. 4, is a cross-section of FIG. 2 taken through the working end of the mandrel.

As can be more readily understood by consideration of FIGS. 2, 3 and 4, the parallel bars 32 and 34 of the holding means are mounted to head stock 20 in such a manner that they cooperate with cutouts 98 and 100 at end 102 of mandrel 50. As will be appreciated, and as will be more readily seen with the later discussed figures, when head stock 20 is moved in the direction as indicated by arrow 26, the parallel bars 32 and 34 cooperate with the cutouts 98 and 100 while supporting a plastic conveyor module to be permanently joined to another plastic conveyor module. As shown in FIG. 1, rods 32 and 34 are separated from the cutout portions 98 and 100 of mandrel 50. However, as was discussed heretofore and as will be appreciated, when support head 20 is moved as indicated by arrow 26, parallel bars 32 and 34 will move toward the cutouts and cooperate therewith. FIG. 2 shows an enlarged view of end 102 of mandrel 50. The ends of bars 32 and 34 are shown in phantom lines to illustrate how the cutouts 98 and 100 in the end 102 of mandrel 50 cooperate with the bars when moved together. FIG. 3, shows a cross-section of the mandrel 50 at a location where the cutouts 98 and 100 do not exist. FIG. 4 on the other hand shows a cross-section of the mandrel in the cutout area. Also referring to FIG. 4, phantom lines again show the position of the parallel bars 34 and 32 when moved into a cooperating position with the cutouts 98 and 100. Thus, as can be seen a plastic module may be fitted over the bars 34 and 32 and then readily moved into position also over the mandrel 50.

Figure 5:
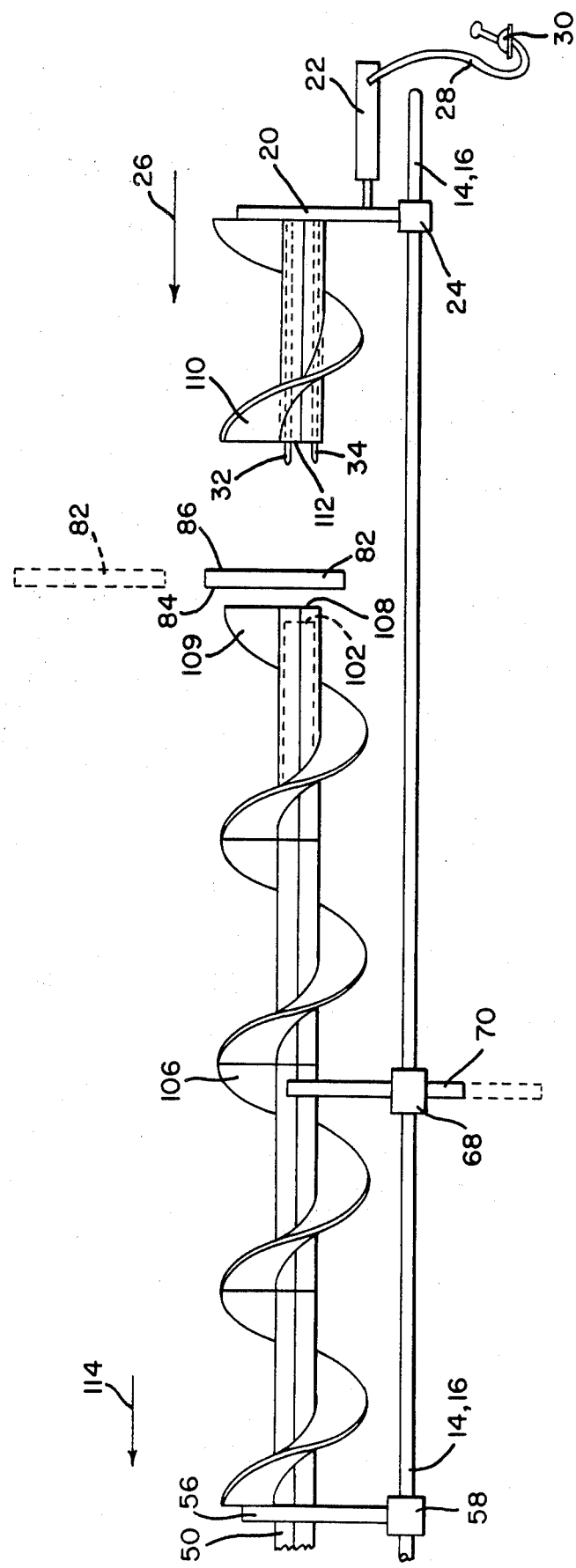
FIG. 5, is a side view of a portion of the apparatus of FIG. 1 showing four modules supported by the mandrel and a fifth module supported by the holding means in preparation for bonding to the four modules on the mandrel.

Referring now to FIG. 5, there is shown a side view of a portion of the apparatus of FIG. 1. As will be appreciated, components of FIG. 1 which are common to that of FIG. 5 will continue to use the same reference numbers. Thus as shown, in addition to the components of the apparatus shown in FIG. 1 a multiplicity 106 of four permanently joined plastic screw conveyor modules are shown as being positioned on mandrel 50. Mandrel 50 is shown as extending through the multiplicity of modules 106 and as can be seen, the end 102 of mandrel 50 stops short of the end 108 of the last previously joined module 109. Also as shown in place is a single module 110 mounted on parallel bars 34 and 32 (shown in phantom lines) of holding means 20. As can be seen, the intermediate support means 68 is shown with the vertical support member 70 in position supporting the multiplicity of joined screw conveyor modules.

FIG. 5 is shown with the modules in position ready to receive the heating means or plate 82 so that when the support head 20 is moved by actuator 22 in the direction indicated by arrow 26, the end 112 of module 110 will contact the hot surface 86 of heating plate 82. Continued movement of the the head 20 will move the hot plate 82 and the module 110 until face 84 of hot plate 82 comes into contact with end 108 of module 109. Thus in operation, the heat and pressure are continually applied until the ends 108 and 112 begin to melt. Module 110 is then moved opposite the direction of arrow 26 by support head 20 so that the hot plate 82 can be removed from between the two ends. Actuator 22 is then again activated, and the partially melted end 112 of module 110 is firmly pressed into contact with partially melted end 108 of module 109. In a preferred embodiment, prior to the joining of the partially melted ends 108 and 110, the combination of modules 106 may be moved along with foot plate 56 in a direction indicated by arrow 114 such that the horizontal bars 34 and 32 may cooperate with the cutout portions 98 and 100 of mandrel 50. In any event, the two ends 108 and 112 are pressed together and held in axial alignment in such joined position until the melted plastic solidifies thereby providing a bond between end module 109 of the combination of modules 106 and individual module 110. The bond between modules 109 and 110 has been approved by the United States Drug Administration (USDA) as a fluid tight bond or seal. Thus, the combination of modules 106 and newly bonded module 110 may then be moved completely on to mandrel 50 and a second individual module added to head stock 20 and the process repeated. It should also be noted that in the embodiment shown in FIGS. 1 through 5, and the embodiment shown in FIGS. 6 and 7 to be discussed hereinafter, support head 20 is shown as providing the relative axial movement and pressure between the multiplicity of joined modules on the support means and the module on the holding means or support head 20. However, in some applications it may be advantageous to move the multiplicity of joined modules on the support means to provide pressure while locking the module on the holding means against axial movement.

Figure 6:
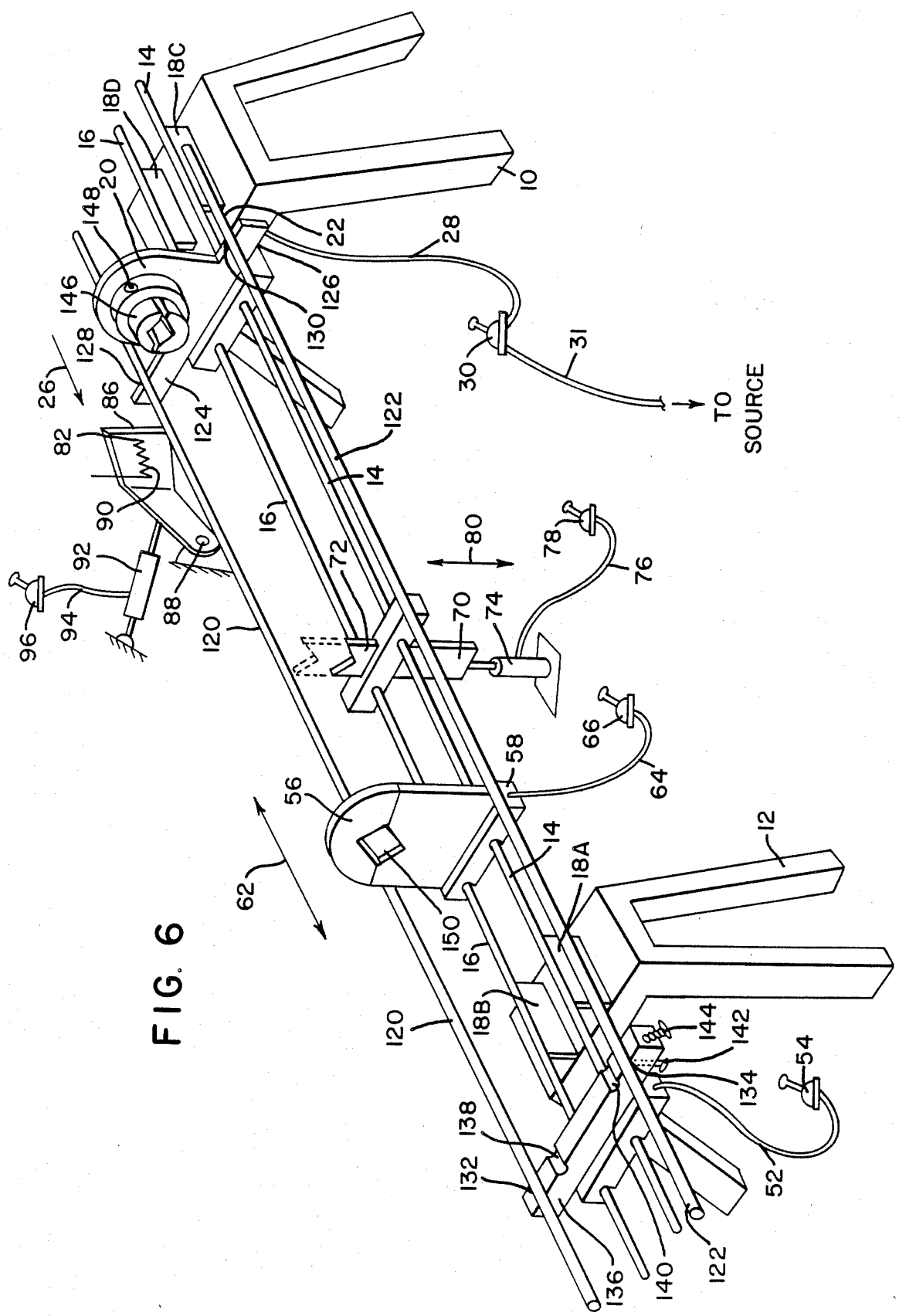
FIG. 6, is a perspective view of another embodiment of apparatus incorporating the features of this invention.
Figure 7:
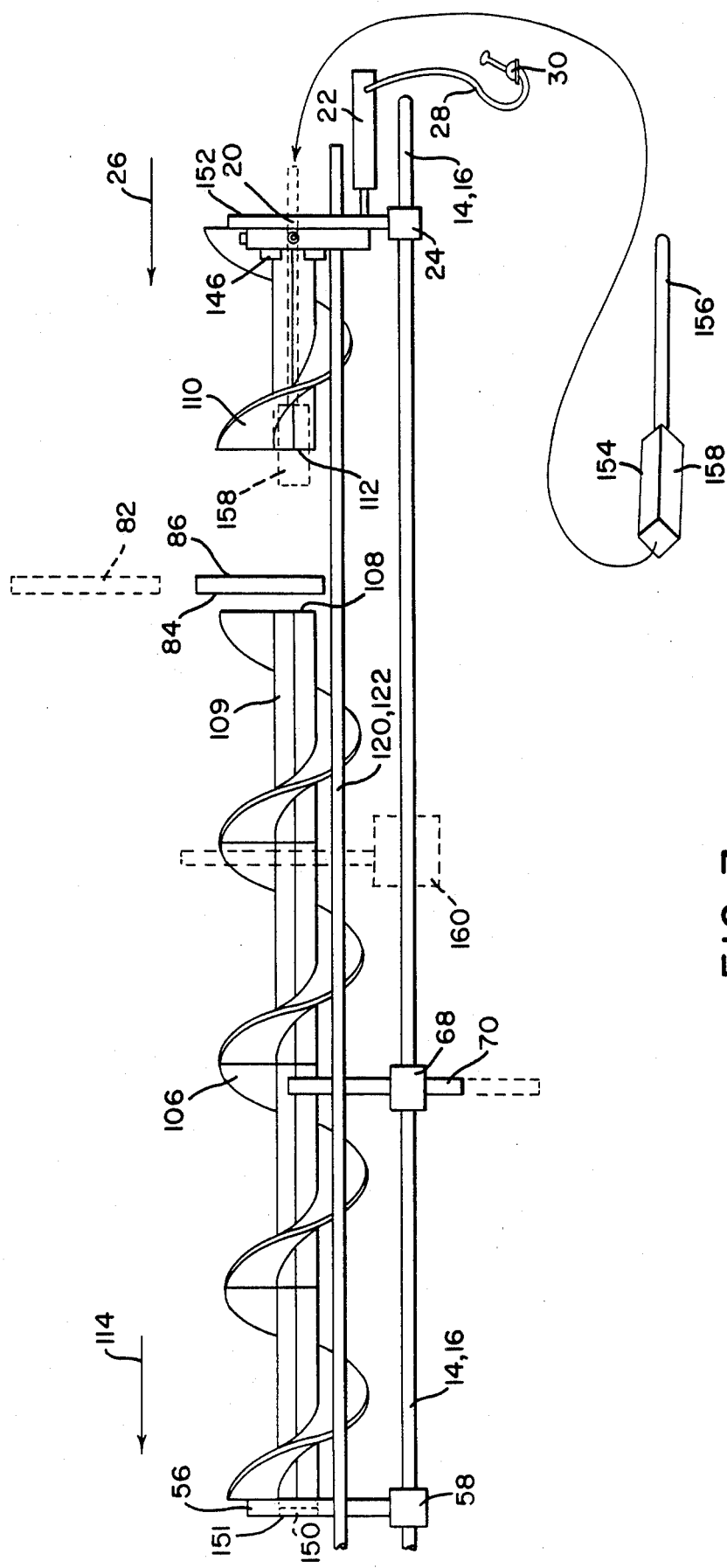
FIG. 7, is a side view of the apparatus of FIG. 6 showing four joined modules and a fifth module supported in preparation for joining.

Referring now to FIGS. 6 and 7, there is shown another embodiment of apparatus for joining or bonding screw conveyor modules. Those portions of the apparatus which are the same and which operate the same as discussed with respect to FIGS. 1 through 5, will carry the same reference numbers and will not be discussed further. As can clearly be seen from the Figs., mandrel 50 shown in FIGS. 1 through 5 which is used to support a multiplicity of joined modules is replaced by a pair of parallel support bars 120 and 122. Thus, instead of the joined modules being supported by mandrel 50 extending through the axial member of the joined modules, the flights of the modules simply rest on the parallel support bars 120 and 122. It should also be clear, that whereas support base 36 of FIG. 1 used for supporting mandrel 50 could be selectively positioned on rails 14 and 16 and locked into position by a pneumatic or hydraulic gripping means, it is not necessary that support base 36 have such a capability in the apparatus of FIGS. 6 and 7 since support bars 120 and 122 extend the full length of the apparatus and are supported at the other end by extensions 124 and 126 connected to support or holding means 20. As shown, parallel support bars 120 and 122 may typically be maintained in position by resting in grooves or cutouts 128 and 130 in extensions 124 and 126 at one end, and in cutouts or grooves 132 and 134 in portion 136 of support base 36. As shown, portion 136 of support base 36 also includes a second pair of cutouts or grooves 138 and 140 such that when the parallel support bars are located in this second pair of grooves, the parallel support bars are suitable for supporting modules having a smaller overall diameter. Similar grooves (not shown) would of course, also be required in extensions 124 and 126 to maintain support bars 120 and 122 parallel. Fine adjustments to the position of the support bars may be made by suitable means such as for example, adjusting screws 142 and 144 shown with respect to support bar 122 resting in groove 134. It will be appreciated that (although not shown) similar adjusting screws would typically also be included with respect to grooves 132, 128 and 130.

In addition, it can be seen that according to FIG. 6, support or holding means 20 no longer includes the pair of parallel beams or bars 32 and 34. Instead, holding means 20 includes a self-centering two-jaw chuck 146 which simply grips the outside of the axial member of a module to be joined. As shown, self-centering chuck 146 would typically include an allen wrench screw 148 for tightening the jaws around the axial member of a module. Finally, foot plate 56 no longer needs a cutout to receive mandrel 50. Consequently, for an embodiment built according to FIGS. 6 and 7, the foot plate 56 may be solid, or alternately as shown, foot plate 56 may include a cutout 150 which is large enough to receive the end 151 of an axial member of a module.

As is more clearly shown in FIG. 7, operation of the apparatus of FIGS. 6 and 7 is substantially the same as was discussed with respect to the apparatus of FIGS. 1 through 5. However, as shown, plate 152 of holding means 20 may include an aperture sufficiently large to permit the use of a manual centering rod 154. Centering rod 154 includes a handle 156 and a head portion 158. Head portion 158 has a cross-section substantially same as the cross-section of the aperture extending through the axial member of each module. Thus, once the ends 108 and 112 of the two modules 109 and 110 has been heated to the melting point, the centering rod 154 is put into the aperture extending through module 110 such that part of the head portion extends beyond face 108 of module 109. The head portion 158 of centering rod 154 will be located partially in module 109 and partially in module 110 thereby assuring that the apertures of the axial members of each are in proper alignment when the bonding takes place.

Figure 8:
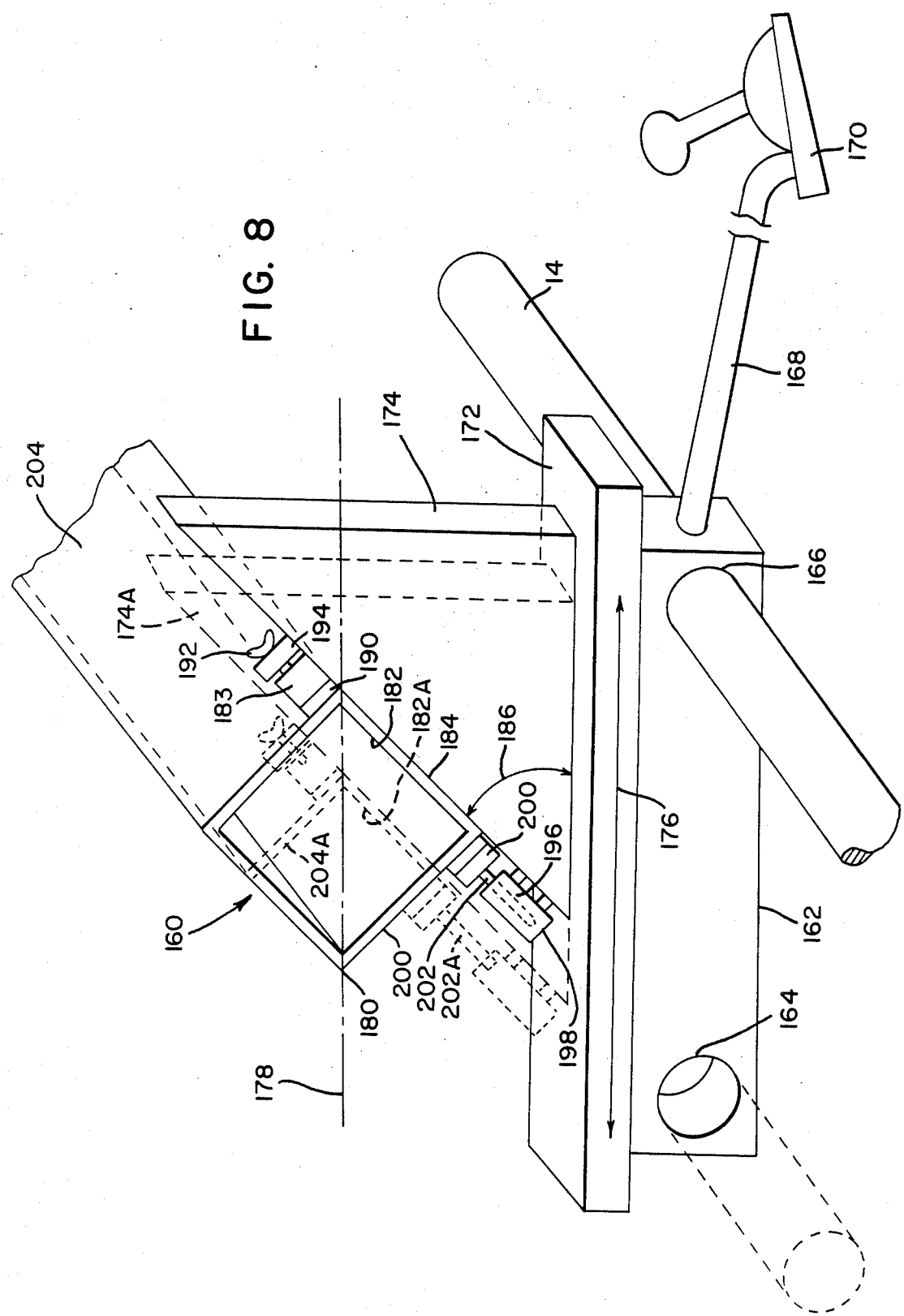
FIG. 8, is a perspective view of apparatus for use with either of the embodiments of FIGS. 1 or 6 for gripping a string of joined modules at an intermediate point.

Referring now to FIG. 8, there is shown an intermediate brake or clamping means suitable for use with the apparatus shown in both FIG. 1 and FIG. 6 when modules having axial members of square cross-sections are bonded. As shown, intermediate brake 160 has a base portion 162 with apertures 164 and 166 which receive or ride on support rails, such as rail 14 in the same manner as holding or support means 20 and foot plate 56. Also in a similar manner as discussed heretofore, intermediate brake or clamping means 160 will also include a hydraulic or pneumatic means such as indicated by line 168 and lever 170 for releasably gripping support rails 14 and 16 such that the intermediate brake may be easily moved along rails 14 and 16 to the required portion and then locked into place while the bonding operation takes place. As shown, intermediate brake 160 includes a support table 172 mounted to base portion 162. A triangular shaped plate 174 is attached to support table 172 such that it may be moved in a horizontal direction as indicated by double headed arrow 176. In addition, as will become clear hereinafter, the triangular shaped plate 174 may be locked at selected locations along its travel path indicated by arrow 176 to accommodate modules having axial members of various size cross-sections. As has been discussed heretofore, and is more clearly seen in FIG. 8, modules having axial member with a square cross-section are supported on the apparatus such that a center line 178 extending through diagonally opposite corners 180 and 182 is horizontal. More specifically as shown in FIG. 8 center line 178 is parallel to the direction of movement of triangular plate 174 on support table 172. Thus, it will be appreciated that side 184 of plate 174 forms a 45° angle with support table 172 as is indicated by double headed arcuate arrow 186. An upper clamping member 188 is mounted to the sloping side 184 of triangular plate 174 such that corner 190 of member 188 will always be located at the center line of the self-adjusting two-jaw holding clamp 146. Consequently, the center line 178 extending between diagonal corners of a square crosssectional axial member will always pass through corner 190 no matter what the position of the triangular member along line 176, and regardless of the fact that modules having square cross-sections of different sizes may be joined by the apparatus. As shown in FIG. 8, to assure corner 190 is on center line 178, fine adjustment of clamping member 188 may be accomplished by a screw adjustment 192 which allows small movement between member 188 and block 194 which is fixedly secured to triangular block 174. Opposite upper clamping member 188 and also mounted to face 184 of triangular plate 174 is a lower clamping member 196. Lower clamping member 196 includes a base portion 198 fixedly mounted to face 184 and a contact portion 200 which is supported by base portion 198 by means of a hydraulic or pneumatic cylinder 202. Thus in operation, triangular plate 174 is moved in either direction as indicated by double headed arrow 176 until corner 182 of the module 204 which is to be gripped, is located at corner 190 of upper clamping member 188. Triangular plate 174 is locked in position on support table 172 and then hydraulic or pneumatic cylinder 202 is activated or extended until contact portion 200 contacts side 206 of module 204. Thus, the axial member of module 204 is firmly gripped between upper clamping member 188 and the contact portion 200 of lower clamping member 196 so as to prevent movement of the module during the binding process.

As was mentioned earlier, the clamping apparatus of FIG. 8 may be used for modules having axial members of different size cross-sections. For example, if modules having an axial member with a substantially smaller cross-section (such as module 204A) are to be joined by the apparatus of the invention, it is only necessary that triangular plate 174 be moved along travel line 176 to the position as indicated by dotted lines and identified by reference number 174A. As can be seen, and as was discussed earlier, the center line 178 is the same for the module with the smaller cross-sectional axial member as it was for the module with the larger axial member. Consequently, when moved to the proper position for the module with a smaller axial member, corner 182A will also be located at corner 190 of upper clamping member 188. However, to make contact with the lower side of the smaller axial member, the cylinder of lower clamping member 196 must be extended a substantially greater distance as indicated by the cylinder in dotted line 202A, so that contact portion 200 can make contact with the lower side of the module having a smaller cross-section. Thus, it should now be clear how the intermediate brake means 160 is suitable for use with modules having axial members of various size cross-section by simply varying the amount of extension of the cylinder 202 which moves contact portion 200 of the lower clamping means 196.

Thus, although there has been described to this point particular embodiments of the apparatus for permanently joining screw conveyor modules in a fluid tight manner, it is not intended that such references be considered as limitations upon the scope of this invention except insofar as set forth in the following claims.

We claim:

1. Apparatus for permanently joining one end of the axial member of a first plastic screw conveyor module having an aperture extending through said axial member from a first end to a second end to one end of the axial member of a second plastic screw conveyor module also having an aperture extending from the first end to a second end through its axial member, said apparatus comprising:
   a support stand;
   a support means for supporting said first module in a position such that its axial member is aligned along a longitudinal axis;
   holding means comprising at least two bars mounted on said support stand and parallel to said longitudinal axis for supporting said second module in a position such that its axial member is aligned with the axial member of said first module, said bars extending into the aperture of said second module and being spaced apart to provide a sliding fit;
   first brake means supported by said support stand for restricting movement of said first module along said longitudinal axis;
   means for partially melting one of said first and second ends of said axial member of said first module and one of said first and second ends of said axial member of said second module; and
   means mounted to said support stand and connected to one of said holding means and brake means for pressing together and holding under pressure said partially melted ends of said first and second modules while said support means and said holding means maintain said axial members of said first and second modules in axial alignment until said partially melted ends solidify such that said first and second modules are bonded and form a unitary screw conveyor.

2. The apparatus of claim 1 wherein said support means is adapted for supporting a multiplicity of modules axially bonded.

3. The apparatus of claims 1 or 2, wherein said support means is a mandrel mounted to said support stand and having an outside perimeter shape suitable for extending through said aperture of said first module.

4. The apparatus of claim 3, wherein said mandrel has a cross-section adaptable for receiving and supporting against rotation around its longitudinal axis a module having a non-circular aperture.

5. The apparatus of claim 4, wherein said holding means is adapted for holding a second module having a shape substantially the same as the shape of said first module.

6. The apparatus of claim 1 wherein said at least two bars cooperate with said aperture of said second module such that rotational movement of said second module is substantially eliminated.

7. Apparatus for use with plastic screw conveyor modules having an axial member encircled by conveyor flights, said apparatus for permanently joining one end of the axial member of a first plastic screw conveyor module having a non-circular aperture extending through said axial member from a first end to a second end to one end of the axial member of a second plastic screw conveyor module also having a similar non-circular aperture extending from the first end to a second end through its axial member, said apparatus comprising:
   a support stand;
   support means mounted on said support stand for supporting said first module in a position such that its axial member is aligned along a longitudinal axis;
   holding means mounted on said support stand for supporting said second module in a position such that its axial member is aligned with the axial member of said first module; clamping means mounted on said support stand for locating and maintaining said second module at a selected rotational position by gripping the outside surface of said axial member of said second module;
   first brake means supported by said support stand, for restricting movement of said first module along said longitudinal axis;
   means for locating and maintaining said axial member of said first module at a selected rotational position such that said non-circular aperture extending through said axial member of said first module is substantially in register with said non-circular aperture extending through said axial member of said second module;
   means for partially melting one of said first and second ends of said axial member of said first module and one of said first and second ends of said axial member of said second module; and
   means mounted to said support stand and connected to one of said support means for said second module and said brake means for pressing together and holding under pressure said partially melted ends of said first and second modules while said support means and said holding means maintain said axial members of said first and second modules in axial and rotational alignment until said partially melted ends solidify such that said first and second modules are bonded and form a unitary screw conveyor from a plurality of modules which has a non-circular aperture extending the length of said unitary screw conveyor.

8. The apparatus of claim 7 wherein said support means for supporting said first module and said holding means for supporting said second module are the same means.

9. The apparatus of claim 7 or 8, wherein said support means is a pair of support rails mounted to said support sand and adapted to support the conveyor flights of said modules.

10. The apparatus of claim 7, wherein said support means is adapted for supporting a multiplicity of modules axially bonded.

11. The apparatus of claims 2 or 10 wherein said support means is adapted for supporting said multiplicity of joined modules at the axial member of a selected one of said multiplicity.

12. The apparatus of claims 2 or 10, and further including a second braking means located between said holding means and said first brake means for clamping the axial member of an intermediate bonded module.

13. The apparatus of claims 1, 2, 7 or 10 wherein said means for partially melting is a heating means adapted for being moved into a position firmly against said ends of said first and second modules and then removable from the partially melted ends.

14. The apparatus of claim 13 wherein said holding means is adaptable for holding a second module having a shape substantially the same as said first module.

15. The apparatus of claim 13 wherein said heating means is mounted to said support stand and is adapted for partially melting material at ends of said first and second modules completely surrounding sadi apperture such that the axial members of such first and second modules are joined with a fluid-tight bond so that fluid cannot move from the outside of said axial member of said module through said joint to the aperture.

16. The apparatus of claim 15 wherein said holding means is adapted for holding a second module having a shape substantially the same as said first module.

17. The apparatus of claim 13 wherein said heating means is located between said first module supported on said support means and said second module supported by said holding means in axial alignment with said first module said heating means having a first heating face to contact an end of said first module and a second heating face to contact an end of said second module.

18. The apparatus of claims 1, 2, 7 or 10 wherein said holding means is adapted for holding a second module having a shape substantially the same as said first module.

19. The apparatus of claim 7 wherein said clamping means is for gripping a non-circular axial member.

20. The apparatus of claim 19, wherein said holding means a self-centering two-jaw chuck for clamping outside surfaces of said axial member of said second module.

21. The apparatus of claim 7 wherein said first brake means and said means for locating and maintaining the rotational position of said first module are the same means.

22. The apparatus of claim 7 wherein said means for locating and maintaining the rotational position of said first module is a centering rod.

* * * * *